United States Patent Office 3,442,869
Patented May 6, 1969

3,442,869
PROCESS FOR THE PREPARATION OF MIXED POLYAMIDES IN FINELY GRAINED FORM
Wolfgang Wolfes, Witten-Bommern, and Gustav Renckhoff, Witten (Ruhr), Germany, assignors to Chemische Werke Witten GmbH, Witten (Ruhr), Germany
No Drawing. Filed Jan. 3, 1966, Ser. No. 517,958
Claims priority, application Germany, Jan. 23, 1965, C 34,936
Int. Cl. C08g 20/20, 20/30
U.S. Cl. 260—78
15 Claims

ABSTRACT OF THE DISCLOSURE

A process for preparing finely granulated polyoxamides which comprises reacting a mixture of a dialkyl or diphenyl diester of oxalic acid and a diphenyl diester of isophthalic and/or terephthalic acid with an organic diamine in a hydrocarbon solvent at 20–150° C. to give a low molecular weight preliminary condensate, and then recondensing the preliminary condensate at 170–350° C. to the desired molecular weight.

---

This invention relates to the preparation of polyamides. More particularly, it relates to a process for the preparation of mixed polyamides of oxalic acid with isophthalic and/or terephthalic acid. Even more particularly, the invention relates to a process for the preparation of mixed polyamides of oxalic acid with isophthalic and/or terephthalic acid in finely grained or granulated form.

It is well known that polyoxamides having useful molecular weights can be produced only if the alkyl esters of oxalic acid or of oxalyl chloride are employed as the starting materials therefor. For example, U.S. Patent 2,558,031 teaches that it is advantageous to react dibutyl oxalate with decamethylenediamine in a solvent, such as alcohol or toluene, at temperatures less than 100° C. An oligomeric preliminary condensate having a relative viscosity of approximately 1.28 is precipitated from the solution. The isolated preliminary condensate is then subsequently condensed in the melt at 270° C. to a technically useful molecular weight.

British Patent 888,150 describes the condensation of dialkyl esters of oxalic acid with aliphatic diamines having from 7 to 10 carbon atoms in an inert solvent such as benzene or toluene, which would involve temperatures of less than 100° C. The specific examples therein specify condensation temperatures of 160–170° C. A preliminary condensate is formed thereby which is subsequently condensed either at temperatures of around 260° in the melt or at temperatures of up to about 5° C. below the melting point of the resultant polyoxamides, after the solvent and the alcohol set free during the reaction have been distilled off. A very similar mode of operation has also been described in an article by Bruck in Industrial and Engineering Chemistry; Product Research and Development section, vol. 2, No. 2, pp. 119–121 (June 1963).

These processes are limited to the use of oxalic esters since the dialkyl esters of other dicarboxylic acids do not react with diamines at low temperatures. And, at higher temperatures, the alcohols liberated tend to alkylate the amines, thus changing the properties of the polyamides formed and forming chain terminators.

Polyoxamides have a good stability to heat and light. The sharp melting points and relatively low melt viscosities thereof, however, render the technical utilization thereof difficult, for example, in injection molding processes. Thermally stable polyamides having a melting range and high melt viscosities can be obtained by a mixed polycondensation involving the use of aromatic dicarboxylic acids, particularly isophthalic and terephthalic acids. With the heretofore known methods, however, this is possible only by an interface condensation from the acid chlorides. For reasons of economics, this process has no significance on the industrial scale.

One of the objects of the present invention is to provide an improved process for the preparation of mixed polyamides of oxalic acid which overcomes the disadvantages and deficiencies of the prior art methods.

Another object of the present invention is to provide a process for the preparation of mixed polyamides of oxalic acid with isophthalic and/or terephthalic acid in finely grained or granulated form which may be carried out in an efficacious and economical manner.

A further object of the invention is to provide a process that yields the said polyamides with a technically useful molecular weight.

A still further object of the invention is to provide a process for the preparation of mixed polyoxamides in finely grained form which may be carried out easily and simply and which avoids the aforementioned problems of the prior art processes.

These and other objects and advantages of the present invention will become apparent to those skilled in the art from a consideration of the following specification and claims.

In accordance with the present invention, it has been found that the desired polyoxamides may be obtained in a readily treatable finely grained form by reacting a mixture of the diesters of oxalic acid with primary or secondary aliphatic alcohols having up to 13 carbon atoms and the diesters of isophthalic and/or terephthalic acid with a phenol with equivalent amounts of a diprimary aliphatic, cycloaliphatic or araliphatic diamine in a suitable solvent at temperatures of from 20° to 150° C. and then subsequently recondensing the thus resultant suspension of preliminary condensate by heating it to a higher temperature, which is below the melting range of the desired polyamide, until the desired degree of polymerization has been attained. This process yields mixed polyamides of oxalic acid with isophthalic and/or terephthalic acid in an advantageous and highly useful granulated form.

The phenol used to esterify the isophthalic and/or terephthalic acid employed in the process described above may be phenol itself, or it may be a phenol substituted with alkyl groups, for example, lower alkyl radicals such as methyl, ethyl, propyl, isopropyl, butyl, sec-butyl, isobutyl, tert-butyl, etc.

The reaction is generally carried out in an aromatic hydrocarbon solvent with vigorous stirring. The recondensation of the preliminary condensate is preferably carried out at a temperature of between about 170° and 350° C. This recondensation may be carried out, if desired, under pressure and/or with an exchange of the original solvent for a higher-boiling nonsolvent for the polyamide.

The permissible upper limit of temperature for the recon- or recondensation depends upon the lower limit of the melting range of the polyamide to be produced. If the recondensation temperature is higher than this, the polyamide particles will become glued together, thereby preventing the formation of the desired powdery product. The permissible upper limit of temperature for the decondensation may be readily determined by a preliminary test. The degree of polymerization may be varied by modifying the temperature and the time of reheating in the recondensation step. Molecular weights corresponding to a relative solution viscosity of at least 1.8 are required in order to obtain polyamides having useful and workable properties.

After the condensation has been completed, the finely grained or granular polyamide is separated from the suspension and washed with a readily volatile agent, such as methanol. Thereafter, a further treatment may be carried out in a suitable apparatus, for example, a tumbler drier, at an elevated temperature, optionally wth the use of a vacuum, in order to remove the last traces of any possibly adhering more volatile substances.

The lower alkyl esters of oxalic acid with alcohols containing from 2 to 5 carbon atoms are especially preferred in the process of the present invention. However, the methyl ester or the higher alkyl esters of oxalic acid with alcohols having up to 13 carbon atoms may also be utilized. Also, diphenyl esters of oxalic acid corresponding to the isophthalic and/or terephthalic acid ester used may be employed.

The diphenyl esters are preferred as the esters of isophthalic and terephthalic acid to be employed. However, as stated above, alkyl-substituted phenyl esters thereof may also be employed, such as the isomeric cresols, xylenols, tert-butylphenols, etc.

All of these diesters may be prepared according to conventional procedures known in the art.

The diprimary aliphatic, cycloaliphatic or araliphaltic diamines commonly employed for the preparation of polyamides may be used as the diamine component in the process of the present invention. These include, for example, tetramethylenediamine, hexamethylenediamine, decamethylenediamine, trimethylhexamethylenediamine, hexahydro-para-xylylenediamine, xylylenediamine, etc.

The dialkyl esters of oxalic acid may be reacted with the diphenyl esters of isophthalic and/or terephthalic acid within a wide range of proportions, for example, in a ratio of 90:10 mole percent to 10:90 mole percent, respectively. When using mixtures of diphenyl isophthalate and diphenyl terephthalate, a molar ratio of 50 to 90 mole percent of diphenyl isophthalate to 50 to 10 percent of diphenyl terephthalate is preferred. The diester component and the diamine components are preferably reacted in approximately equivelent amounts. By equivalent amounts is means that the number of ester groups to be reacted is approximately equal to the number of amino groups to be reacted.

Benzene is particularly suitable as the solvent for the primary reaction of the ester mixtures with the diamine, but other aromatic hydrocarbons, such as toluene, the xylenes, tetralin, biphenyl, etc., may also be employed. The subsequent further condensation or recondensation of the suspension of preliminary condensate at elevated temperatures may be carried out in the same solvent. However, when employing low boiling solvents, the use of a pressure apparatus is required if the temperature of the recondensation is above the corresponding boiling point of the solvent. It may, therefore, be advantageous to exchange the originally used solvent for another higher boiling solvent and, if this is done, it is expedient to choose a solvent whose boiling range coincides with the desired temperature of recondensation.

Thus, in accordance with an embodiment of the process of the present invention, it is advantageous to proceed in such a manner that the suspension of the preliminary condensate is gradually heated to a higher temperature while a new higher boiling solvent is added to the same extent and proportion as the originally employed solvent distills off. In this regard, the added higher boiling solvent need not be an aromatic hydrocarbon. The only condition to be met with this new solvent is that it be a nonsolvent for the polyamide formed. Thus, in addition to the aforementioned aromatic hydrocarbons, aliphatic hydrocarbons, for example, corresponding paraffin fractions such as Kogasin I and Kogasin II, may be utilized.

Because of their pulverulent nature, the polyamides obtained may be readily dissolved in conventional polyamide solvents, such as phenol/tetrachloroethane, etc. and further processed as desired. On the other hand, the resultant polyamides may be employed at once for further processing on injection molding machines or extrusion presses, depending on the desired needs therefor. The polyamides of the present invention are also useful for coating metals by the vortex sintering process.

The following examples are given merely as illustrative of the present invention and are not to be considered as limiting thereof.

The relative solution viscosity of the polyamides which is indicated in the following examples for characterizing the degree of polymerization thereof was determined by measuring the viscosity of a 1% polymer solution (1 gram of substance per 100 cc. of solution) in phenol-tetrachloroethane (60/40) in an Ostwald viscosimeter at a temperature of 25° C. The percent figures indicated in the examples are mole percents. All of the condensations were carried out under nitrogen.

Example I.—Preparation of mixed polyamide of 90% oxalic acid and 10% of a mixture of 95% isophthalic acid and 5% terephthalic acid with decamethylenediamine 6.36 grams (0.02 mole) of a mixture of diphenyl isophthalate and diphenyl terephthalate (95:5) and 36.36 grams (0.18 mole) of dibutyl oxalate are dissolved in 300 ml. of benzene at 70° C. in a 750 ml. three-necked flask equipped with stirrer, reflux cooler, dropping funnel and thermometer. While stirring of this mixture is carried out, 34.4 grams of decamethylenediamine (0.2 mole), dissolved in 100 ml. of benzene, is added dropwise at boiling temperature over a period of approximately 30 minutes. Stirring is continued for another 2 hours at reflux temperature. A finely grained polyamide thereby precipitates from the solution.

The degree of polycondensation of the obtained polyamide is insufficient for practical working purposes, it having a relative viscosity of 1.25. The benzene and the butanol freed during the reaction are then distilled off within one hour over a small column, and the volume of material in the flask which is distilled off is simultaneously replaced by the same volume of dodecylbenzene. After the temperature has slowly risen to 220° C., a recondensation is carried out at this temperature for another four hours. After cooling, the still finely grained polyamide is suctioned off, thoroughly washed with methanol, and dried. Any remaining volatile constituents are then removed by heating under vacuum at 190° C. The relative viscosity of the finally obtained polyamide is 3.0.

Example II.—Preparation of mixed polyamide of 25% oxalic acid and 75% of a mixture of 85% isophthalic acid and 15% terephthalic acid with tetramethylenediamine In the same manner as described in Example I, 23.85 grams (0.075 mole) of a mixture of diphenyl isophthalate and diphenyl terephthalate (85:15) and 5.05 grams (0.025 mole) of dibutyl oxalate are reacted with 8.8 grams (0.1 mole) of tetramethylenediamine in 200 ml. of benzene. The benzene is subsequently exchanged, while being distilled off, with 200 ml. of dodecylbenzene. Recondensation is then carried out at 190° C. for three hours. The resultant isolated polyamide powder is extracted with benzene and dried. It has a relative viscosity of 2.87.

Example III.—Preparation of mixed polyamide of 50% oxalic acid and 50% of a mixture of 80% isophthalic acid and 20% terephthalic acid with hexamethylenediamine As described in Example I, 79.45 grams (0.25 mole) of a mixture of diphenyl isophthalate and diphenyl terephthalate (80:20) and 50.5 grams (0.25 mole) of dibutyl oxalate are reacted with 58 grams (0.5 mole) of hexamethylenediamine in 1 liter of benzene. The benzene is subsequently exchanged, while it is being distilled off, for 1 liter of diethylbenzene. Recondensation is then carried out at 180° C. under reflux for 3½ hours. The further treatment of the thus obtained finely grained polymide is the same as described in Example I. The final product has a relative viscosity of 2.21.

Example IV.—Preparation of mixed polyamide of 30% oxalic acid and 70% of a mixture of 70% isophthalic acid and 30% terephthalic acid with hexamethylenediamine In the same manner as described in Example III, 44.5 grams (0.14 mole) of a mixture of diphenyl isophthalate and diphenyl terephthalate (70:30) and 7.1 grams (0.06 mole) of dimethyl oxalate are initially condensed with 23.2 grams (0.2 mole) of hexamethylenediamine in 200 ml. of benzene and then recondensed in 200 ml. of diethylbenzene for 2 hours at 180° C. Further treatment of the polyamide powder is carried out in the same way as described in Example I. The relative viscosity of the final product is 2.0.

Example V.—Preparation of mixed polyamide of 25% oxalic acid and 75% of a mixture of 60% isophthalic acid and 40% terephthalic acid with hexamethylenediamine As described in Example III, 47.7 grams (0.15 mole) of a mixture of diphenyl isophthalate and diphenyl terephthalate (60:40) and 15.7 grams (0.05 mole) of bis(2-ethylhexyl) oxalate are reacted with 23.2 grams (0.2 mole) of hexamethylenediamine in 400 ml. of benzene and then recondensed in 400 ml. of diethylbenzene for five hours at 180° C. Further treatment of the polyamide powder is carried out in the same way as described in Example I. The relative viscosity of the final product is 3.45.

Example VI.—Preparation of mixed polyamide of 25% oxalic acid and 75% of a mixture of 60% isophthalic acid and 40% terephthalic acid with hexamethylenediamine A procedure identical to that described in Example V is carried out with the exception that 22.7 grams (0.05 mole) of ditridecyl oxalate is employed in lieu of the bis(2-ethylhexyl) oxalate. The relative viscosity of the finely grained polyamide product is 3.13.

Example VII.—Preparation of mixed polyamide of 10% oxalic acid and 90% of a mixture of 50% isophthalic acid and 50% terephthalic acid with hexamethylenediamine As described in Example III, 143.1 grams (0.45 mole) of a mixture of diphenyl isophthalate and diphenyl terephthalate (50:50) and 10.1 grams (0.05 mole) of dibutyl oxalate are reacted with 58 grams (0.5 mole) of hexamethylenediamine in 1 liter of benzene. The resultant product is then recondensed in 1 liter of diethylbenzene for 3 hours at 180° C. The further treatment of the polyamide powder is the same as described in Example I. The finally obtained polyamide product has a relative viscosity of 2.28.

Example VIII.—Preparation of mixed polyamide of 20% oxalic acid and 80% of a mixture of 50% isophthalic acid and 50% terephthalic acid with a diamine mixture of 70% hexamethylenediamine and 30% hexahydro-para-xylylenediamine In the same manner as described in Example III, 50.9 grams (0.16 mole) of a mixture of diphenyl isophthalate and diphenyl terephthalate (50:50) and 8.1 grams (0.04 mole) of dibutyl oxalate are reacted with 16.25 grams (0.14 mole) of hexamethylenediamine and 8.5 grams (0.06 mole) of hexahydro-para-xylyenediamine in 400 ml. of benzene and subsequently recondensed in 400 ml. of diethylbenzene for three hours at 180° C. Further treatment of the obtained polyamide powder is the same as described in Example I. The relative viscosity of the obtained finely grained polyamide product is 2.3.

Example IX.—Preparation of mixed polyamide of 20% oxalic acid and 80% of a mixture of 50% isophthalic acid and 50% terephthalic acid with a diamine mixture of 70% hexamethylenediamine and 30% para-xylylenediamine The condensation conditions are the same as described in Example VIII. However, instead of the hexahydro-para-xylylenediamine employed in Example VIII, an equivalent amount of para-xylylenediamine (8.15 grams, 0.06 mole) is employed. The relative viscosity of the finally obtained granule-like polyamide product is 2.58.

Example X.—Preparation of mixed polyamide of 25% oxalic acid and 75% terephthalic acid with hexamethylenediamine In the same manner as described in Example I, 51.8 grams (0.15 mole) of dicresyl terephthalate (prepared from an isomeric mixture of cresols) and 10.1 grams (0.05 mole) of di-sec-butyl oxalate are dissolved in 500 ml. of xylene at boiling temperature. At 136° C., a solution of 23.2 grams (0.2 mole) of hexamethylenediamine in 100 ml. of xylene is added thereto dropwise. A powdery preliminary condensate polyamide is immediately precipitated. Stirring is then continued for another hour at boiling temperature. The entire reaction mixture is thereafter transferred into a stirrer autoclave and recondensed at 270° C. under nitrogen. After cooling, the polyamide powder is suctioned off and freed from solvent residues, as described in Example I. The finally obtained finely grained polyamide product has a relative viscosity of 2.1.

The invention being thus described, it will be obvious that the same may be varied in many ways. Such variations are not to be regarded as a departure from the spirit and scope of the invention and all such modifications are intended to be included within the scope of the following claims.

We claim:
1. A process for the preparation of mixed polyamides of oxalic acid and an organic acid selected from the group consisting of isophthalic acid, terephthalic acid and mixtures thereof in finely grained form which comprises reacting a mixture consisting essentially of a dialkyl diester of oxalic acid and a diphenyl or alkyl-substituted diphenyl diester of said organic acid with a diprimary aliphatic, cycloaliphatic or araliphatic diamine in a hydrocarbon solvent at a temperature of from about 20° to 150° C. to give a low molecular weight preliminary condensate and subsequently recondensing said preliminary condensate by heating it to a temperature of from about 170° to 350° C., the recondensation temperature being below the melting range of the resultant polyamide, until the desired degree of polymerization has been obtained.

2. The process of claim 1, wherein the alkyl groups in said dialkyl diester of oxalic acid contain from 1 to 13 carbon atoms.

3. The process of claim 2, wherein said diester mixture contains from 90 to 10 mole percent of said dialkyl diester of oxalic acid to 10 to 90 mole percent of said diester of said organic acid.

4. The process of claim 1, wherein said diester mixture and said diamine are reacted in approximately equivalent amounts.

5. The process of claim 1, wherein said solvent is an aromatic hydrocarbon.

6. The process of claim 1, wherein the recondensation is carried out under pressure.

7. The process of claim 1, wherein said solvent is replaced by a nonsolvent for the polyamide during the recondensation.

8. The process of claim 7, wherein said non-solvent is higher boiling than said solvent.

9. A process for the preparation of mixed polyamides of oxalic acid and an organic acid selected from the group consisting of isophthalic acid, terephthalic acid and mixtures thereof in finely grained form which comprises reacting approximately equivalent amounts of a mixture consisting essentially of a diester selected from the group consisting of dialkyl diesters wherein the alkyl groups contain from 1 to 13 carbon atoms, diphenyl diesters and alkyl-substituted diphenyl diesters of oxalic acid and a diphenyl or alkyl-substituted diphenyl diester of said organic acid with a diprimary aliphatic, cycloaliphatic or araliphatic diamine in an aromatic hydrocarbon solvent at a temperature of from about 20° to 150° C. to give a low molecular weight preliminary condensate and subsequently recondensing said preliminary condensate by heating it to a temperature of from about 170° C. to 350° C., the recondensation temperature being below the melting range of the resultant polyamide, until the desired degree of polymerization has been obtained.

10. The process of claim 9, wherein the recondensation is carried out under pressure.

11. The process of claim 9, wherein said solvent is replaced by a non-solvent for the polyamide during the recondensation.

12. The process of claim 11, wherein said non-solvent is higher boiling than said solvent.

13. The process of claim 9, wherein said diester of oxalic acid is a lower dialkyl diester, said lower alkyl groups containing from 2 to 5 carbon atoms and wherein said diamine is hexamethylenediamine.

14. The process of claim 9, wherein said diester of said organic acid is a mixture of 50 to 90 mole percent of diphenyl isophthalate and 50 to 10 mole percent of diphenyl terephthalate.

15. The process of claim 9, wherein said diester mixture contains from 90 to 10 mole percent of said dialkyl diester of oxalic acid to 10 to 90 mole percent of said diester of said organic acid.

References Cited

UNITED STATES PATENTS

| | | | |
|---|---|---|---|
| 2,880,197 | 3/1959 | Coleman | 260—78 |
| 3,139,417 | 6/1964 | Duxbury | 260—78 |
| 3,247,168 | 4/1966 | Stamatoff et al. | 260—78 |
| 3,329,653 | 7/1967 | Beavers et al. | 260—78 |

FOREIGN PATENTS 1,096,602   1/1961   Germany.

WILLIAM H. SHORT, *Primary Examiner.*

H. D. ANDERSON, *Assistant Examiner.*